US012562633B2

(12) United States Patent
Nogawa

(10) Patent No.: US 12,562,633 B2
(45) Date of Patent: Feb. 24, 2026

(54) USING DIFFERENT VOLTAGE LEVELS TO CLOSE A SWITCH IN A SWITCH CONVERTER

(71) Applicant: Qorvo US, Inc., Greensboro, NC (US)

(72) Inventor: Masashi Nogawa, Sachse, TX (US)

(73) Assignee: Qorvo US, Inc., Greensboro, NC (US)

( * ) Notice: Subject to any disclaimer, the term of this patent is extended or adjusted under 35 U.S.C. 154(b) by 182 days.

(21) Appl. No.: 18/244,645

(22) Filed: Sep. 11, 2023

(65) Prior Publication Data

US 2024/0162806 A1     May 16, 2024

Related U.S. Application Data

(60) Provisional application No. 63/424,189, filed on Nov. 10, 2022.

(51) Int. Cl.
*H02M 3/158* (2006.01)
*H02M 1/00* (2006.01)
*H02M 1/08* (2006.01)

(52) U.S. Cl.
CPC ........... *H02M 1/08* (2013.01); *H02M 1/0006* (2021.05); *H02M 3/1582* (2013.01)

(58) Field of Classification Search
CPC ...... G09G 3/3696; G09G 3/36; G09G 3/3688; G09G 3/20; G09G 3/3614; H03K 17/687; H03K 17/223; H03K 17/6872; H02M 3/07; H02M 3/158; H02M 3/156; H02M 3/155; H02M 3/33507; H02M 3/1588; H02M 3/33523; H02M 3/073
See application file for complete search history.

(56) References Cited

U.S. PATENT DOCUMENTS

| | | | |
|---|---|---|---|
| 6,903,597 B2 | 6/2005 | Tai | |
| 8,138,818 B2 | 3/2012 | Tsunoda et al. | |
| 10,707,840 B2 * | 7/2020 | Bodano | H03K 17/04106 |
| 10,790,818 B1 | 9/2020 | Frank | |
| 10,868,521 B2 | 12/2020 | Choi et al. | |
| 11,018,661 B2 | 5/2021 | Kaneda | |
| 2010/0283515 A1 | 11/2010 | Kelley et al. | |

(Continued)

OTHER PUBLICATIONS

Extended European Search Report for European Patent Application No. 23207957.4, mailed Mar. 20, 2024, 8 pages.

(Continued)

*Primary Examiner* — Bryan R Perez
(74) *Attorney, Agent, or Firm* — Withrow & Terranova, P.L.L.C.

(57) ABSTRACT

Embodiments of a switching circuitry are disclosed. In some embodiments, the switching circuitry includes a switch and a switch control circuit. The switch has a control terminal. The driver circuit is configured to initially apply a first voltage at a first voltage level to the control terminal so that the switch goes from being open to being closed. The driver circuit is configured to apply a second voltage at a second voltage level in response to the first voltage causing a voltage at the control terminal of the switch to reach a threshold voltage level, wherein the second voltage level is smaller in magnitude than the first voltage level. By using a higher voltage level when initially closing the switch, the switch is closed quickly. Once the switch is closed a lower voltage level is used to maintain the switch closed.

21 Claims, 4 Drawing Sheets

(56) References Cited

U.S. PATENT DOCUMENTS

| 2014/0285242 | A1 |   | 9/2014 | Liang |
| 2015/0229494 | A1 | * | 8/2015 | Kiuchi .................... H04L 25/06 |
|  |  |  |  | 375/219 |

OTHER PUBLICATIONS

Examination Report for European Patent Application No. 23207957. 4, mailed Nov. 5, 2025, 8 pages.

* cited by examiner

DCIN and DCOUT arranged in buck configuration in FIG. 1. For boost configuration DCIN is at DC2 and DCOUT is at DC1 where DC1 is connected to shunt output capacitor in output filter 104

400

402
OPENING THE SWITCH

404
APPLYING A FIRST VOLTAGE TO A CONTROL TERMINAL OF THE SWITCH IN ORDER TO CLOSE THE SWITCH

406
APPLYING A SECOND VOLTAGE TO THE CONTROL TERMINAL ONCE A VOLTAGE AT THE CONTROL TERMINAL OF THE SWITCH REACHES A THRESHOLD VOLTAGE LEVEL, WHEREIN THE SECOND VOLTAGE LEVEL IS SMALLER IN MAGNITUDE THAN THE FIRST VOLTAGE LEVEL

USING DIFFERENT VOLTAGE LEVELS TO CLOSE A SWITCH IN A SWITCH CONVERTER

RELATED APPLICATIONS

This application claims the benefit of U.S. provisional patent application Ser. No. 63/424,189, filed Nov. 10, 2022, the disclosure of which is hereby incorporated herein by reference in its entirety.

FIELD OF THE DISCLOSURE

This disclosure relates generally to switch control circuits for switch converter applications.

BACKGROUND

Switch converters are used to efficiently convert a DC input voltage at a first voltage level to a DC output voltage at a second voltage level. The switch converter does this by opening and closing a primary and a secondary switch and filtering the output of the switch converter with an output filter. The primary and secondary switch are generally each provided as a field effect transistor (FET). To open and close the primary and second switches, a gate voltage is applied to the primary and secondary switches. Opening and closing these switches quickly is important to the power efficiency of the switch converter.

SUMMARY

Embodiments of a switch converter are disclosed. In some embodiments, the switch converter includes an output filter, and switching circuitry. The switching circuitry includes a switch and a driver circuit. The switch has a control terminal. The driver circuit is configured to initially apply a first voltage at a first voltage level to the control terminal so that the switch goes from being open to being closed. The driver circuit is configured to apply a second voltage at a second voltage level in response to the first voltage causing a voltage at the control terminal of the switch to reach a threshold voltage level, wherein the second voltage level is smaller in magnitude than the first voltage level. In this manner, the switch is closed quickly and once the switch is closed a lower voltage level is used to maintain the switch closed thereby increasing power efficiency.

In another aspect, any of the foregoing aspects individually or together, and/or various separate aspects and features as described herein, may be combined for additional advantage. Any of the various features and elements as disclosed herein may be combined with one or more other disclosed features and elements unless indicated to the contrary herein.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

Figure 1:
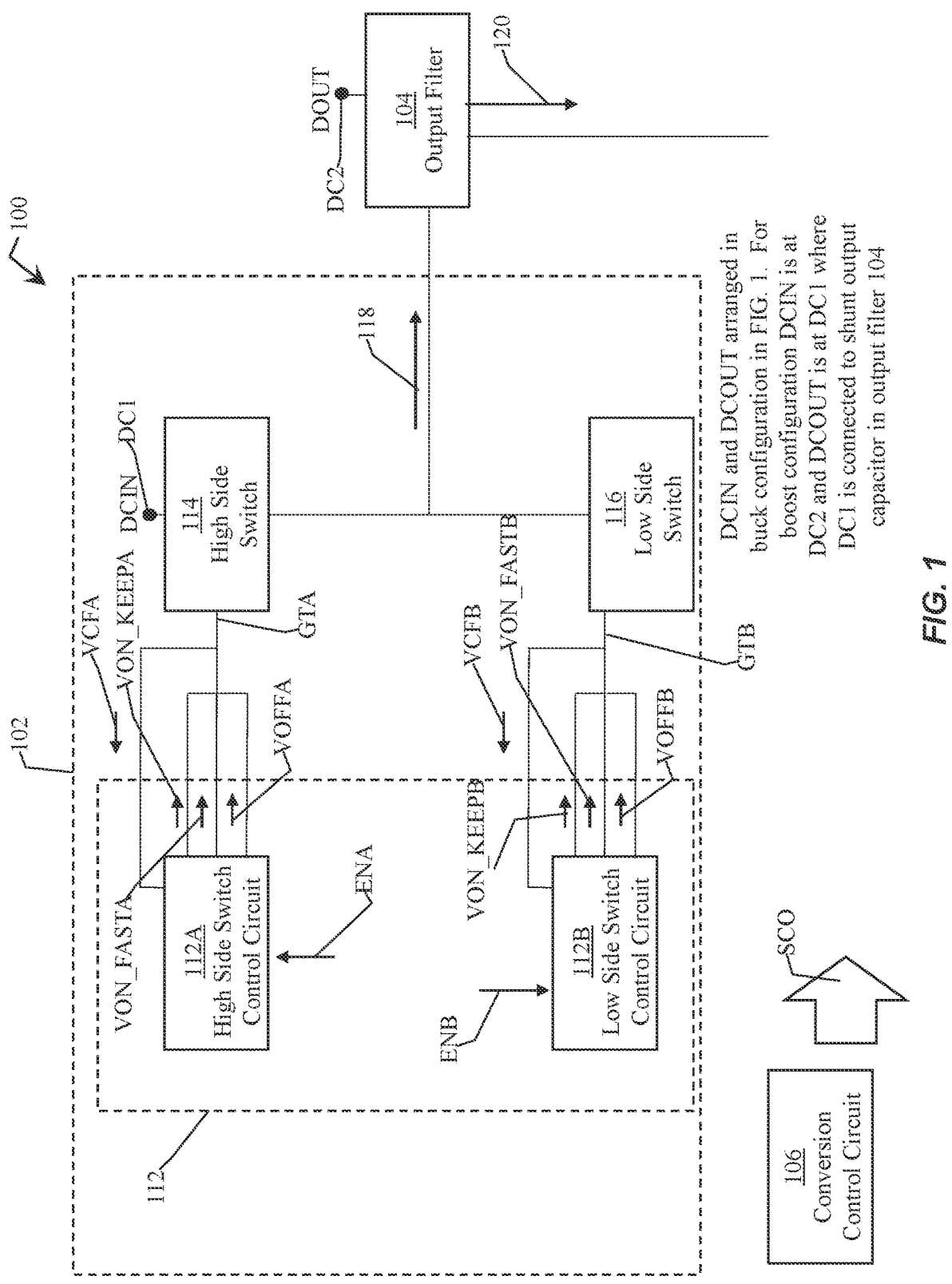
FIG. 1 is a block diagram of a switch converter, in accordance with some embodiments.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments are described herein with reference to schematic illustrations of embodiments of the disclosure. As such, the actual dimensions of the layers and elements can be different, and variations from the shapes of the illustrations as a result, for example, of manufacturing techniques and/or tolerances, are expected. For example, a region illustrated or described as square or rectangular can have rounded or curved features, and regions shown as straight lines may have some irregularity. Thus, the regions illustrated in the figures are schematic and their shapes are not intended to illustrate the precise shape of a region of a device and are not intended to limit the scope of the disclosure. Additionally, sizes of structures or regions may be exaggerated relative to other structures or regions for illustrative purposes and, thus, are provided to illustrate the general structures of the present subject matter and may or may not be drawn to scale. Common elements between figures may be shown herein with common element numbers and may not be subsequently re-described.

Embodiments of a switching circuitry are disclosed. In some embodiments, the switching circuitry includes a switch and a switch control circuit. The switch has a control terminal. The driver circuit is configured to initially apply a first voltage at a first voltage level to the control terminal so that the switch goes from being open to being closed. The driver circuit is configured to apply a second voltage at a second voltage level in response to the first voltage causing a voltage at the control terminal of the switch to reach a threshold voltage level, wherein the second voltage level is smaller in magnitude than the first voltage level. By using a higher voltage level when initially closing the switch, the switch is closed quickly. Once the switch is closed a lower voltage level is used to maintain the switch closed. Using a lower voltage level increases the power efficiency of the switch converter. In some embodiments, the driver circuit includes different voltage generation circuits that generate the first voltage and the second voltage. One voltage generation circuit is turned on to provide the first voltage and then is turned off once the voltage level at the control terminal reaches the threshold voltage level. In response to the voltage level at the control terminal reaching the threshold voltage level, the second voltage generation circuit is turned on to generate the second voltage. In other embodiments, two different voltage generation circuits are used to generate the first voltage and then, once the voltage at the control terminal reaches the threshold voltage level, one of the two voltage generation circuits is turned off to generate the second voltage.

FIG. 1 is a block diagram of a switch converter 100, in accordance with some embodiments.

The switch converter 100 is configured to receive a DC voltage DCIN and generate a DC voltage DCOUT. The DC voltage level of the DC voltage DCIN is different than the DC voltage level of the DC voltage DCOUT, in accordance with some embodiments. The DC voltage level of the DC voltage DCOUT depends on the configuration and manner of operating the switch converter 100.

The switch converter 100 includes a switching circuitry 102, an output filter 104, and a conversion control circuit 106. The switching circuitry 102 includes a driver circuit 112, a switch 114, and a switch 116. The driver circuit 112 is configured to operate a switch 114 and a switch 116 so that the switch 114 and the switch 116 are opened (non-conducting state) and closed (conducting state). The conversion control circuit 106 is configured to control the opening and closing of the switch so that the output filter 104 generates the DC voltage DCOUT. The switch 114 is referred to as a high side switch. The switch 116 is the low side switch. In some embodiments, the switch 116 is connected to ground.

In FIG. 1, the switching circuitry 102 is configured to operate in the buck configuration. As such, the DC input voltage DCIN is configured to be received at node DC1, which is connected to the power input (e.g., the drain when the switch 114 is an N-type FET) of the switch 114. Furthermore, the DC output voltage DCOUT is configured to be output at node DC2 connected to the output filter 104, (e.g., connected to a power inductor). In other embodiments, the switching circuitry 102 is in the boost configuration. In the boost configuration, the DC input voltage DCIN is received at DC2 (connected to the power inductor of the output filter 104) and output from the node DC1 (in the boost configuration, the node DC1 is connected to a shunt capacitor in the output filter 104).

In some embodiments, the conversion control circuit 106 is provided by a microcontroller unit (MCU). In some embodiments, the switch 114 is a field effect transistor (FET). In some embodiments, the switch 114 is an N-channel type FET (NFET). In some embodiments, the switch is an NFET for with a Silicon Carbide (SiC) type substrate or a Gallium Arsenide (GaN) substrate. In some embodiments, the switch 114 is a Junction-Gate FET (JFET). SiC and GaN are utilized in high voltage applications, such as applications were the DC voltage DCIN and DC voltage DCOUT have DC voltage levels greater than or equal to 100 Volts. In FIG. 1, the switch 114 and the switch 116 are connected in a half-bridge configuration.

In some embodiments, the switch 116 is a FET. In some embodiments, the switch 116 is an NFET. In some embodiments, the switch is an NFET for with an SiC type substrate or a GaN substrate. In some embodiments, the switch 116 is a JFET. SiC and GaN are utilized in high voltage applications, such as applications were the DC voltage DCIN and DC voltage DCOUT have DC voltage levels greater than or equal to 100 Volts.

The conversion control circuit 106 is configured to generate a switch control output SCO that is configured to cause the driver circuit 112 to open and close the switch 114 and the switch 116. In FIG. 1, the control output SCO includes an enable signal ENA. The conversion control circuit 106 is configured to generate the enable signal ENA in an activation state to close the switch 114. In some embodiments, the activation state is a high voltage state. In some embodiments, the activation state is a low voltage state. The conversion control circuit 106 is configured to generate in a deactivation state to open the switch 114. The deactivation state is generally an antipodal state to the activation state. For example, if the activation state is a high voltage state, the deactivation state is a low voltage state. If the activation state is a low voltage state, the deactivation state is a high voltage state. In FIG. 1, the control output SCO includes an enable signal ENB. The conversion control circuit 106 is configured to generate the enable signal ENB in an activation state to close the switch 116. In some embodiments, the activation state is a high voltage state. In some embodiments, the activation state is a low voltage state. The conversion control circuit 106 is configured to generate in a deactivation state to open the switch 116. The deactivation state is generally an antipodal state to the activation state. For example, if the activation state is a high voltage state, the deactivation state is a low voltage state. If the activation state is a low voltage state, the deactivation state is a high voltage state.

By opening and closing the switch 114 and the switch 116, a switching node voltage 118 is generated from the DC voltage DCIN. The switching node voltage 118 is input into the output filter 104. The output filter 104 filters the switching node voltage 118 to generate the DC voltage DCOUT. A duty cycle of the switching node voltage 118 determines a DC voltage level of the DC voltage DCOUT.

The conversion control circuit 106 cycles the switching circuitry 102 through various switching states in order to convert the DC input voltage DCIN at node DC1 into the DC output voltage DCOUT at node DC2. In particular, in first switching state, the primary switch is closed and the secondary switch is opened. In second switching state, the primary switch is opened and the secondary switch is closed. If the switching circuitry 102 were perfectly synchronized, then the first switching state and the second switching state would be all that would be necessary in order to convert the DC voltage DCIN to the DC voltage DCOUT. However, since perfect synchronization is not normally achievable, a third switching state is added always between switching from the first switching state to the second switching state or between second switching state and the first switching state. More specifically, having both the primary and the secondary switch closed simultaneously is to be avoided in order to avoid that the primary switch and the secondary switch be closed simultaneously causing a short circuit. In the third switching state, both the primary and the secondary switch are opened. This ensures that the primary and secondary switch are never both closed when transitioning between the first switching state and the second switching state since the third switching state is always provided in between the first and second switching states.

In some embodiments, the switch 114, the switch 116, and the output filter 104 are configured as a boost converter (i.e., step-up DC to DC converter). In the boost converter configuration, the primary switch is the switch 116 while the switch 114 is the secondary switch. In the boost configuration, the switch 116 is connected in shunt with respect to a power inductor in the output filter 104. The switch 114 is connected in series between an output end of a power inductor in the output filter 108 and a node where a shunt output capacitor in the output filter 108 is connected. The DC input voltage DCIN is received at an input end of the power inductor at node DC2. The DC output voltage is output from node DC1, which in the boost configuration is connected to the node where the shunt output capacitor in the shunt output capacitor is connected in the output filter 104.

In some embodiments, the switch 114, the switch 116, and the output filter 104 are configured as a buck converter (i.e., step-down DC to DC converter). In the buck converter configuration, the primary switch is the switch 114 while the switch 116 is the secondary switch. In the buck configuration, the switch 114 is connected in series with respect to the node DC1. The input voltage DCIN is received at the node DC1 in the buck configuration. The node DC1 is connected to the output filter 108 through the switch 114 in the buck configuration. The switch 114 is connected in series between the node DC1 and the output filter 108. The switch 116 is connected in shunt at a node between an output of the switch 114 and the output filter 108. The DC output voltage DCOUT is output from the node DC2, where the node DC2 is connected at an output end of the power inductor and a node where a shunt output capacitor is connected in the output filter 108.

The driver circuit 112 includes a high side switch control circuit 112A and a low side switch control circuit 112B. The high side switch control circuit 112A is configured to open and close the switch 114 while a low side switch control circuit 112B is configured to open and close the switch 116. In some embodiments, the switch 114 is a wideband gap transistor such as N-channel JFET from with a silicon carbide (SiC) or Gallium Arsenide (GaN) semiconductor substrate. To open the switch 114, the high side switch control circuit 112A is configured to apply a voltage VOFFA having a first voltage polarity to a control terminal GTA of the switch 114. In some embodiments, the control terminal GTA is the gate of the JFET used as the switch 114. In some embodiments, the voltage VOFFA has a negative voltage polarity. In some embodiments, the voltage VOFFA is a DC voltage having a DC voltage level. In some embodiments, the voltage VOFFA has a DC voltage level of −10V or −15V. The voltage VOFFA is generated by a voltage generation circuit in response to the enable signal ENA being in the deactivation state. In some embodiments, the voltage generation circuit is a voltage source. In some embodiments, the voltage generation circuit includes a current source and a current mirror.

In response to the enable signal ENA transitioning from the deactivation state to the activation state, the voltage generation circuit that generates the VOFFA is disconnected. In some embodiments, the high side switch control circuit 112A is configured to connect another voltage generation circuit that generates a voltage VON_FASTA to the control terminal GTA of the switch 114. The voltage VON_FASTA having a second voltage polarity opposite the first voltage polarity of the voltage VOFFA. In some embodiments, the voltage VON_FASTA has a positive voltage polarity with a current at a current level. In some embodiments, the voltage VON_FASTA is a DC voltage having a DC voltage level. In some embodiments, the voltage VON_FASTA has a DC voltage level of +5V or +15V. In some embodiments, the current has a DC current level of 1 mA. The voltage VON_FASTA is an overdrive voltage and is configured to close (i.e., turn on) the switch 114 quickly so that the switch converter 100 operates faster. The voltage VON_FASTA is generated by a voltage generation circuit. In some embodiments, the voltage generation circuit is a voltage source. In some embodiments, the voltage generation circuit includes a current source and a current mirror.

The high side switch control circuit 112A is configured to receive a feedback signal VCFA that indicates a voltage level of a voltage at the control terminal GTA. The feedback signal VCFA allows for the voltage at the control terminal GTA to be monitored until the voltage at the control terminal GTA reaches. In response to the voltage at the control terminal GTA reaching a threshold voltage level, the high side switch control circuit 112A is configured to stop applying the VON_FASTA and, also, 112A is configured to apply a voltage VON_KEEPA to the control terminal GTA while maintaining the current at the same set current level applied to the control terminal GTA. In some embodiments, the threshold voltage level has a positive voltage polarity but is less than the voltage level of the voltage VON_FASTA. In some embodiments, the threshold voltage level is +2 Volts. In some embodiments, the threshold voltage level is between 0 Volts to 5 Volts. In some embodiments, the DC voltage level of the voltage VON_KEEPA has a positive voltage polarity but is less than the voltage level of the voltage VON_FASTA. In some embodiments, DC voltage level of the voltage VON_KEEPA is +2 Volts. In some embodiments, the threshold voltage level is between 0 Volts to 5 Volts. In some embodiments, the set current level is 1 mA. The voltage VON_KEEPA is generated by a voltage generation circuit. In some embodiments, the voltage generation circuit is a voltage source. In some embodiments, the voltage generation circuit includes a current source and a current mirror.

In some embodiments, the switch 114 is a JFET formed on a SiC substrate. In this example, the switch 114 operates so as to have diode with an anode at the gate and a cathode at the source. When the current having a current level of 1 mA is applied source from the gate to the source, this diode will be forward biased at a forward bias voltage. The exact value of the forward bias voltage depends on comes to a certain voltage range (depending on the silicon-carbide process we use). In some embodiments, the forward bias voltage is around +2V but in other embodiments the forward bias voltage is different depending on the configuration of the FETs used to provide the switch 114. Assuming the switch is a SiC JFET used in a high-voltage, high-power systems, a power-loss from this 1 mA source is negligible. In some embodiments, it is this forward bias voltage that is used as the threshold voltage and as the voltage level of the voltage VON_KEEPA. This voltage is well above the turn-on voltage of the SiC JFET and enhances the switch 114.

In some embodiments, the switch 116 is a wideband gap transistor such as N-channel JFET from with a silicon carbide (SiC) or Gallium Arsenide (GaN) semiconductor substrate. To open the switch 116, the low side switch control circuit 112B is configured to apply a voltage VOFFB having a first voltage polarity to a control terminal GTB of the switch 116. In some embodiments, the control terminal GTB is the gate of the JFET used as the switch 116. In some embodiments, the voltage VOFFB has a negative voltage polarity. In some embodiments, the voltage VOFFB is a DC voltage having a DC voltage level. In some embodiments, the voltage VOFFB has a DC voltage level of −10V or −15V. The voltage VOFFB is generated by a voltage generation circuit in response to the enable signal ENB being in the deactivation state. In some embodiments, the voltage generation circuit is a voltage source. In some embodiments, the voltage generation circuit includes a current source and a current mirror.

In response to the enable signal ENB transitioning from the deactivation state to the activation state, the voltage generation circuit that generates the VOFFB is disconnected. In some embodiments, the low side switch control circuit 112B is configured to connect another voltage generation circuit that generates a voltage VON_FASTB to the control terminal GTB of the switch 116. The voltage VON_FASTB having a second voltage polarity opposite the first voltage polarity of the voltage VOFFB. In some embodiments, the voltage VON_FASTB has a positive voltage polarity with a current at a current level. In some embodiments, the voltage VON_FASTB is a DC voltage having a DC voltage level. In some embodiments, the voltage VON_FASTB has a DC voltage level of +5V or +15V. In some embodiments, the current has a DC current level of 1 mA. The voltage VON_FASTB is an overdrive voltage and is configured to close (i.e., turn on) the switch 116 quickly so that the switch converter 100 operates faster. The voltage VON_FASTB is generated by a voltage generation circuit. In some embodiments, the voltage generation circuit is a voltage source. In some embodiments, the voltage generation circuit includes a current source and a current mirror.

The low side switch control circuit 112B is configured to receive a feedback signal VCFB that indicates a voltage level of a voltage at the control terminal GTB. The feedback signal VCFB allows for the voltage at the control terminal GTB to be monitored until the voltage at the control terminal GTB reaches. In response to the voltage at the control terminal GTB reaching a threshold voltage level, the low side switch control circuit 112B is configured to stop applying the low side switch control circuit 112B is configured to apply a voltage to the control terminal GTB while maintaining the current at the same set current level applied to the control terminal GTB. In some embodiments, the threshold voltage level has a positive voltage polarity but is less than the voltage level of the voltage VON_FASTB. In some embodiments, the threshold voltage level is +2 Volts. In some embodiments, the threshold voltage level is between 0 Volts to 5 Volts. In some embodiments, the DC voltage level of the voltage VON_KEEPB has a positive voltage polarity but is less than the voltage level of the voltage VON_FASTB. In some embodiments, DC voltage level of the voltage VON_KEEPB is +2 Volts. In some embodiments, the threshold voltage level is between 0 Volts to 5 Volts. In some embodiments, the set current level is 1 mA. The voltage VON_KEEPB is generated by a voltage generation circuit. In some embodiments, the voltage generation circuit is a voltage source. In some embodiments, the voltage generation circuit includes a current source and a current mirror.

In some embodiments, the switch 116 is a JFET formed on a SiC substrate. In this example, the switch 116 operates so to have diode with an anode at the gate and a cathode at the source. When the current having a current level of 1 mA is applied source from the gate to the source, this diode will be forward biased at a forward bias voltage. The exact value of the forward bias voltage depends on comes to a certain voltage range (depending on the silicon-carbide process we use). In some embodiments, the forward bias voltage is around +2V but in other embodiments the forward bias voltage is different depending on the configuration of the FETs used to provide the switch 116. Assuming the switch is a SiC JFET used in a high-voltage, high-power systems, a power-loss from this 1 mA source is negligible. In some embodiments, it is this forward bias voltage that is used as the threshold voltage and as the voltage level of the voltage VON_KEEPB. This voltage is well above the turn-on voltage of the SiC JFET and enhances the switch 116.

Figure 2:
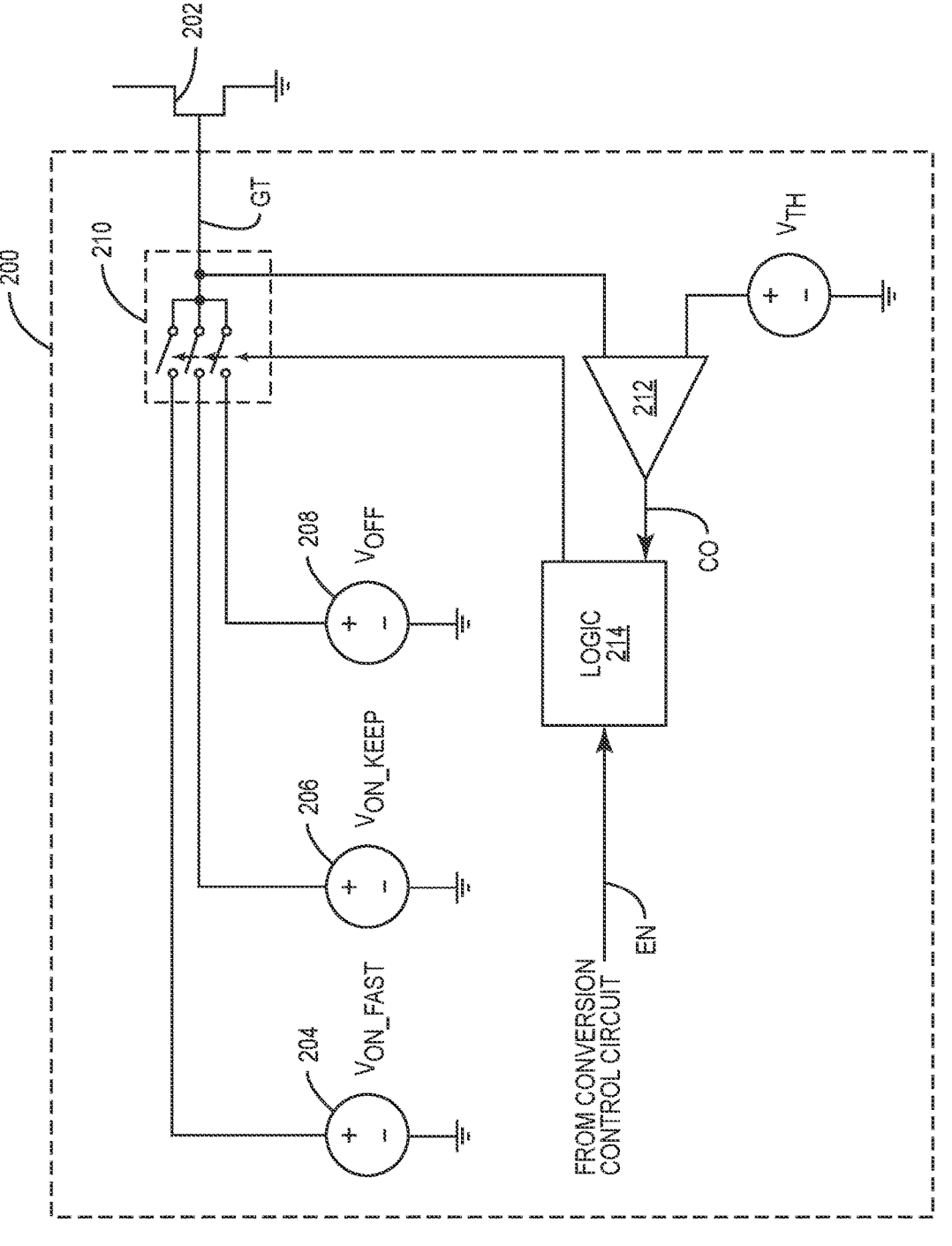
FIG. 2 is a circuit diagram of a switch and a driver, in accordance with some embodiments.

FIG. 2 is a circuit diagram of a switch control circuit 200, in accordance with some embodiments.

The switch control circuit 200 is discussed with reference to its functionality with respect to FIG. 1. It should be noted that this is simply one application of the switch control circuit 200. The switch control circuit 200 is applicable in any application where a switch, such as a FET and in particular a JFET, is to be opened and closed. With respect to the switch converter 100 in FIG. 1, in some embodiments, the high side switch control circuit 112A in FIG. 1 is provided in the same manner as the switch control circuit 200 and/or the low side switch control circuit 112B in FIG. 1 is provided in the same manner as the switch control circuit 200 in FIG. 1. The switch control circuit 200 is connected to a switch 202. In some embodiments, the switch 202 is the switch 114 in FIG. 1. In some embodiments, the switch 202 is the switch 116 in FIG. 1.

The switch control circuit 200 includes a voltage generation circuit 204, a voltage generation circuit 206, a voltage generation circuit 208, selection circuitry 210, a comparator 212, and control logic 214. The control logic 214 is configured to operate the selection circuitry 210 to select whether the voltage generation circuit 204, the voltage generation circuit 206, or the voltage generation circuit 208 is connected to the control terminal GT of the switch 202. In some embodiments, the control terminal GT is the control terminal GTA in FIG. 1. In some embodiments, the control terminal GT is the control terminal GTB in FIG. 1.

The voltage generation circuit 204 is configured to generate the voltage VON_FAST at the set current level, as explained above with respect to FIG. 1. In some embodiments, the voltage generation circuit 204 is a voltage source. In some embodiments, the voltage generation circuit 204 is provided by a current source connected to a current mirror. In some embodiments, the voltage VON_FAST is the voltage VON_FASTA in FIG. 1. In some embodiments, the voltage VON_FAST is the voltage VON_FASTB in FIG. 1.

The voltage generation circuit 206 is configured to generate the voltage VON_KEEP at the same set current level, as explained above with respect to FIG. 1. In some embodiments, the voltage generation circuit 206 is a voltage source. In some embodiments, the voltage generation circuit 206 is provided by a current source connected to a current mirror. In some embodiments, the voltage VON_KEEP is the voltage VON_KEEPA in FIG. 1. In some embodiments, the voltage VON_KEEP is the voltage VON_KEEPB in FIG. 1.

The voltage generation circuit 208 is configured to generate the voltage VOFF, as explained above with respect to FIG. 1. In some embodiments, the voltage generation circuit 208 is a voltage source. In some embodiments, the voltage generation circuit 208 is provided by a current source connected to a current mirror. In some embodiments, the voltage VOFF is the voltage VOFFA in FIG. 1. In some embodiments, the voltage VOFF is the voltage VOFFB in FIG. 1.

The control logic 214 is configured to receive a comparator signal CO from the comparator 212. The control logic 214 is configured to receive an enable signal EN from the conversion control circuit 106. In some embodiments, the enable signal EN is the enable signal ENA in FIG. 1. In some embodiments, the enable signal EN is the enable signal ENB in FIG. 1.

The comparator 212 is configured to receive a feedback signal VCF at a first terminal having a voltage level that is indicative of the voltage level at the control terminal GT. In some embodiments, the feedback signal VCF is the feedback signal VCFA in FIG. 1. In some embodiments, the feedback signal VCF is the feedback signal VCFB in FIG. 1. At a second terminal, the comparator signal CO is configured to receive a threshold voltage VTH having a threshold voltage level. In some embodiments, the threshold voltage level corresponds to the voltage at the control terminal GTA being at +2 Volts. The comparator 212 is configured to generate the comparator signal CO in a first voltage state (e.g., a high voltage state) in response to a voltage level of the feedback signal VCF being less than a threshold voltage level of the threshold voltage VTH. The comparator 212 is configured to generate the comparator signal CO in a second voltage state (e.g., a low voltage state) in response to the voltage level of the feedback signal VCF being greater than the threshold voltage level of the threshold voltage VTH.

In response to the enable signal EN being in a deactivation state (and regardless of the voltage state of the comparator signal CO), the control logic 214 operates the selection circuitry 210 so that the voltage generation circuit 208 applies the voltage VOFF to the gate terminal GT. The control logic 214 also disconnects the voltage generation circuit 206 and the voltage generation circuit 208 from the control terminal GT. Accordingly, the switch 202 is open (i.e. turned off).

In response to the enable signal EN being in an activation state and the comparator signal CO being in the first voltage state (wherein the first voltage state indicates that the voltage at the control terminal GT is below the threshold voltage), the control logic 214 operates the selection circuitry 210 so that the voltage generation circuit 206 and the voltage generation circuit 208 are disconnected from the control terminal GT. Additionally, the control logic 214 operates the selection circuitry 210 so that the voltage generation circuit 204 is connected to the control terminal GT wherein the voltage generation circuit 204 applies the voltage VON_FAST to the gate terminal GT. The voltage generation circuit 204 also applies a current at a current level to the gate terminal GT. Accordingly, the switch 202 is closed (i.e., turned on) quickly.

In response to the enable signal EN being in the activation state and the comparator signal CO being in the second voltage state (wherein the second voltage state indicates that the voltage at the control terminal GT is above the threshold voltage by the 212 comparator), the control logic 214 operates the selection circuitry 210 so that the voltage generation circuit 204 and the voltage generation circuit 208 are disconnected from the control terminal GT. Additionally, the control logic 214 operates the selection circuitry 210 so that the voltage generation circuit 206 is connected to the control terminal GT wherein the voltage generation circuit 204 applies the voltage VON_KEEP to the gate terminal GT. The voltage generation circuit 206 also applies a current to the gate terminal GT with the same current level as the voltage generation circuit 206. As explained with respect to FIG. 1, the voltage level of the voltage VON_KEEP is lower than the voltage level of the voltage VON_KEEP. Accordingly, the switch 202 remains (i.e., turned on) close but the power consumed to maintain the switch 202 closed is lowered.

Figure 3:
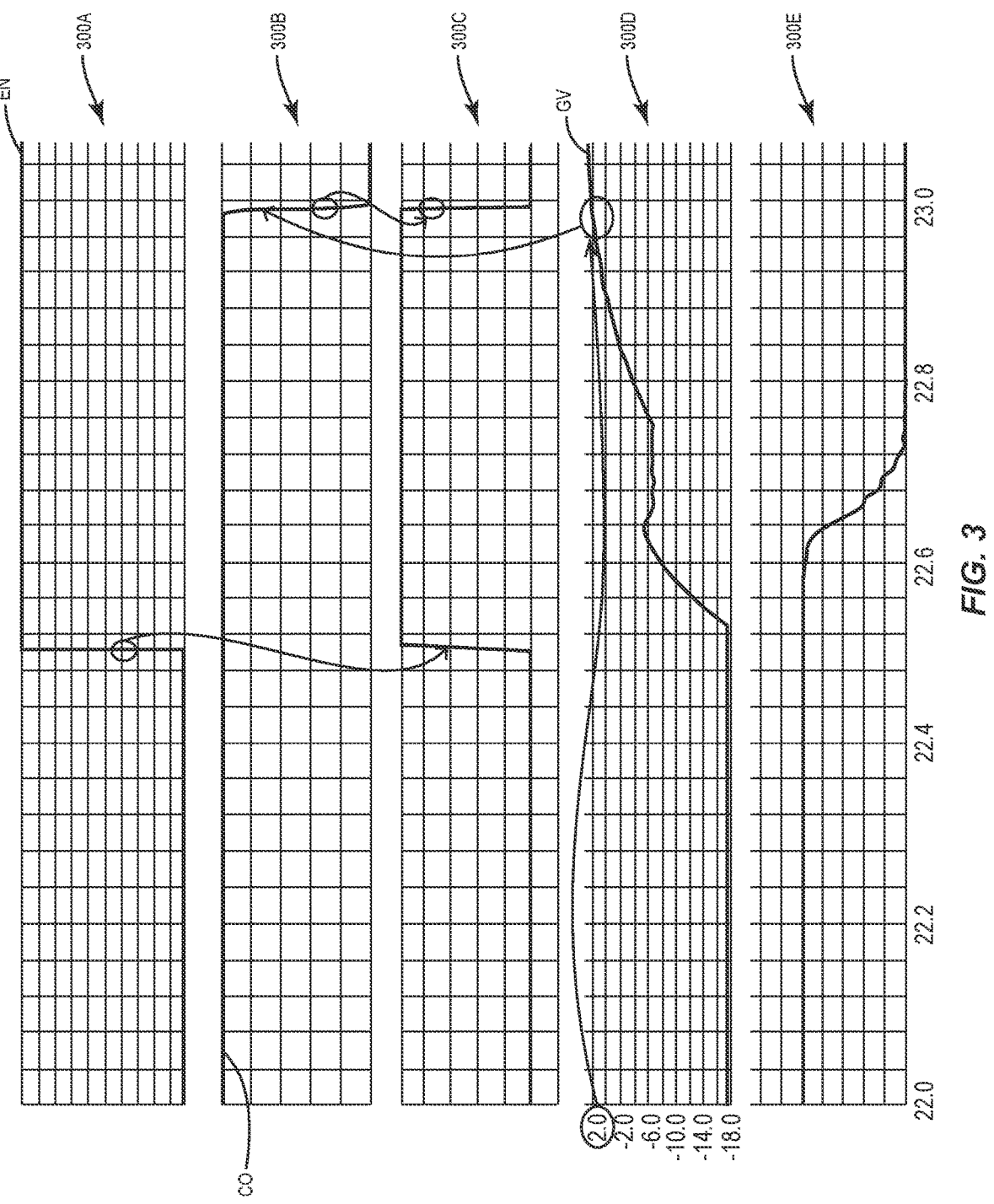
FIG. 3 illustrates voltage diagrams that demonstrate the operation of the driver circuit in FIG. 2, in accordance with some embodiments.

FIG. 3 illustrates voltage diagrams that demonstrate the operation of the switch control circuit 200 in FIG. 2, in accordance with some embodiments.

In some embodiments, the voltage diagrams describe the operation of the switch control circuit 200 in FIG. 2. A voltage diagram 300A is a voltage diagram illustrating the enable signal EN in FIG. 2 versus time. A voltage diagram 300B illustrates the comparator signal versus time. A voltage diagram 300C is a selection signal that indicates that the voltage generation circuit 204 is connected to the control terminal GT in a high voltage state and indicates that the voltage generation circuit 204 is disconnected from the control terminal GT in a low voltage state. A voltage diagram 300D illustrates a voltage GV at the control terminal GT (e.g., the gate voltage of the switch 214 or the gate voltage of the switch 216) versus time. A voltage diagram 300E illustrates a voltage level across the switch 202 (e.g., the voltage across the switch 214 or voltage across the switch 216).

As shown in the voltage diagram 300A, at 22.5 picoseconds, the enable signal goes from the deactivation state to the activation state. The comparator signal CO is in a high voltage state indicating that the gate voltage GV is below the threshold voltage level (which in this example is 2V. As a result, the voltage generation circuit 204 applies the voltage VON_FAST to the control terminal GT of the switch 202. At 22.88 picoseconds, the gate voltage GV reaches the threshold voltage, which in this example is +2 Volts. Accordingly, the comparator signal CO goes into the low voltage state. In response, the voltage generation circuit 204 is disconnected from the gate terminal GT at 22.95 picosecond. Additionally, the voltage generation circuit 206 is connected to the control terminal GT to apply the voltage VON_KEEP to the gate terminal to maintain the gate voltage GV at +2V.

In other embodiments, the voltage generation circuit 204 and the voltage generation circuit 206 both apply the voltage VON_FAST and the voltage VON_KEEP to initially close the switch 214. After the threshold voltage is reached, the voltage generation circuit 204 stops applying the voltage VON_FAST and only the voltage generation circuit 206 applies the voltage VON_KEEP to maintain the switch 214 closed.

Figure 4:
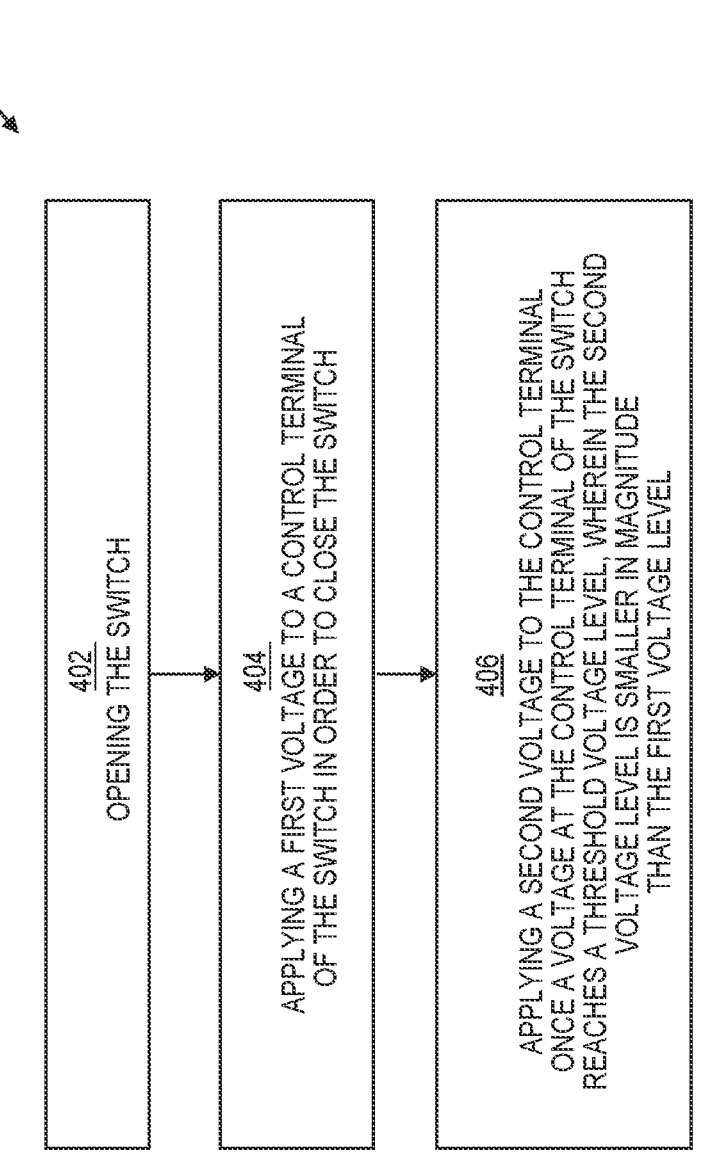
FIG. 4 illustrates a flow diagram of a method of operating a switch converter having a switch, in accordance with some embodiments.

FIG. 4 illustrates a flow diagram 400 of a method of operating a switch converter having a switch, in accordance with some embodiments.

In some embodiments, the flow diagram 400 is performed by the switch converter 100 in FIG. 1 or the switch converter 200 in FIG. 2. The flow diagram includes blocks 402-406. Flow begins at the block 402.

At the block 402, a switch is opened. In some embodiments, a switch is open by connecting the voltage generation circuit 208 to apply the voltage VOFF to the control terminal GT of the switch 202. Flow then proceeds to the block 404.

At the block 404, a first voltage is applied to a control terminal of the switch in order to close the switch. In some embodiments, the first voltage is applied by connecting the voltage generation circuit 204 to the control terminal GT. The voltage generation circuit 204 applies the first voltage as the voltage VON_FAST. In some embodiments, a current is applied to the control terminal GT at a DC current level. Flow then proceeds to the block 406.

At the block 406, a second voltage is applied to the control terminal once a voltage at the control terminal of the switch reaches a threshold voltage level, wherein the second voltage level is smaller in magnitude than the first voltage level. In some embodiments, the second voltage is applied by connecting the voltage generation circuit 206 to the control terminal GT. The voltage generation circuit 206 applies the second voltage as the voltage VON_KEEP. In addition, the voltage generation circuit 206 applies a current with the same DC current level as the voltage generation circuit 204 to the control terminal GT.

It is contemplated that any of the foregoing aspects, and/or various separate aspects and features as described herein, may be combined for additional advantage. Any of the various embodiments as disclosed herein may be combined with one or more other disclosed embodiments unless indicated to the contrary herein.

Those skilled in the art will recognize improvements and modifications to the preferred embodiments of the present disclosure. All such improvements and modifications are considered within the scope of the concepts disclosed herein and the claims that follow.

What is claimed is:
1. Switching circuitry, comprising:
a switch having a control terminal; and
a switch control circuit having a first voltage generation circuit configured to generate a first voltage having a first voltage polarity, a second voltage generation circuit configured to generate a second voltage having a second voltage polarity that is opposite the first voltage polarity, a third voltage generation circuit configured to generate a third voltage having the second voltage polarity, wherein the switch control circuit is configured to:
apply the first voltage from the first voltage generation circuit to the control terminal to open the switch;
apply the second voltage from the second voltage generation circuit to the control terminal to close the switch when a voltage at the control terminal is below a threshold voltage level, wherein a voltage level of the second voltage is higher than a voltage level of the third voltage; and
apply the third voltage from the third voltage generation circuit to the control terminal to maintain the switch closed when the voltage at the control terminal is above the threshold voltage level.

2. The switching circuitry of claim 1, wherein:
the second voltage generation circuit is further configured to apply a first current at a first current level when the voltage at the control terminal is below the threshold voltage level; and
the third voltage generation circuit is further configured to apply the same first current at the first current level when the voltage at the control terminal is above the threshold voltage level.

3. The switching circuitry of claim 2, wherein at least one of the second voltage generation circuit and third voltage generation circuit includes a current source that generates the first current.

4. The switching circuitry of claim 1, wherein the switch is a first switch, the switching circuitry further comprising a second switch, wherein the first switch and the second switch are in a buck configuration.

5. The switching circuitry of claim 1, wherein the switch is a first switch, the switching circuitry further comprising a second switch, wherein the first switch and the second switch are in a boost configuration.

6. The switching circuitry of claim 1, wherein the switch is a first switch and the control terminal is a first control terminal, the switching circuitry further comprising a second switch having a second control terminal, wherein the switch control circuit is further configured to:
apply the third voltage to the second control terminal of the second switch when applying the first voltage to the first control terminal of the first switch; and
apply the first voltage to the second control terminal of the second switch when applying the third voltage to the first control terminal of the first switch.

7. The switching circuitry of claim 6, wherein the first switch is a first Junction-Gate Field Effect Transistor (JFET) and the second switch is a second JFET.

8. The switching circuitry of claim 1, wherein the switch control circuit comprises a comparator having a first terminal configured to receive a feedback signal having a voltage level that is indicative of the voltage level at the control terminal and a second terminal configured to receive a threshold voltage having a threshold voltage level, the comparator being configured to generate a comparator signal that is in a first voltage state in response to the voltage level of the feedback signal being below the threshold voltage level and is configured to generate the comparator signal in a second voltage state in response to the voltage level of the feedback signal being above the threshold voltage level.

9. The switching circuitry of claim 8, further comprising selection circuitry and logic wherein the logic is configured to:

receive the comparator and an enable signal; and cause the selection circuitry to apply the first voltage of the first voltage generation circuit to the control terminal in response to the enable signal being in a deactivation state.

10. The switching circuitry of claim 9, wherein the logic is further configured to cause the selection circuitry to apply the second voltage from the second voltage generation circuit to the control terminal to close the switch in response to the enable signal being in an activation state and the comparator signal being in the first voltage state.

11. The switching circuitry of claim 10, wherein the logic is further configured to cause the selection circuitry to apply the third voltage from the third voltage generation circuit to the control terminal to maintain the switch closed in response to the enable signal being in the activation state and the comparator signal being in the second voltage state.

12. The switching circuitry of claim 1, further comprising a switching node, wherein a switching node voltage is configured to be generated from a direct current (DC) input voltage in response to operation of the switch.

13. The switching circuitry of claim 12, further comprising an output filter coupled to the switching node and configured to generate a DC output voltage from the switching node voltage.

14. The switching circuitry of claim 13, wherein the switch is a first switch, the switching circuitry further comprising a second switch connected to the switching node, wherein the first switch and the second switch are in a buck configuration.

15. The switching circuitry of claim 14, wherein the first switch is a first junction-gate Field Effect Transistor (JFET) and the second switch is a second JFET.

16. The switching circuitry of claim 13, wherein the switch is a first switch, the switching circuitry further comprising a second switch connected to the switching node, wherein the first switch and the second switch are in a boost configuration.

17. The switching circuitry of claim 16, wherein the first switch is a first wide junction-gate Field Effect Transistor (JFET) and the second switch is a second JFET.

18. The switching circuitry of claim 13, wherein the switch is a first switch, the switching circuitry further comprising a second switch connected to the switching node, wherein the first switch and the second switch are driving one phase of a motor device.

19. The switching circuitry of claim 1, wherein the first voltage polarity is a negative voltage polarity and the second voltage polarity is a positive voltage polarity.

20. A switch converter, comprising:

an output filter;

switching circuitry that includes a switch and a switch control circuit, wherein:

the switch is coupled to the output filter;

the switch has a control terminal;

the switch control circuit is configured to initially apply a first voltage at a first voltage level to the control terminal so that the switch goes from being open to being closed, wherein the first voltage has a first polarity; and the switch control circuit is configured to apply a second voltage at a second voltage level in response to the first voltage causing a voltage at the control terminal of the switch to reach a threshold voltage level so that the switch goes from being closed to being open, wherein the second voltage level is smaller in magnitude than the first voltage level and wherein the second voltage has a second polarity that is opposite the first polarity of the first voltage; and a conversion control circuit configured to operate with the switch control circuit to open and close the switch so that the output filter generates a direct current (DC) voltage.

21. A method of operating a switch converter having a switch that is opened and closed to generate a direct current (DC) voltage, the method comprising:

opening the switch;

applying a first voltage to a control terminal of the switch in order to close the switch, the first voltage having a first voltage level wherein the first voltage has a first polarity; and applying a second voltage having a second voltage level to the control terminal in response to a voltage at the control terminal of the switch reaching a threshold voltage level so that the switch goes from being closed to being open, wherein the second voltage level is smaller in magnitude than the first voltage level and wherein the second voltage has a second polarity that is opposite the first polarity of the first voltage.

\* \* \* \* \*